United States Patent [19]

Emrich

[11] E Patent Number: Re. 33,042

[45] Reissued Date of Patent: Sep. 5, 1989

[54] EXCAVATING TOOTH ASSEMBLY

[75] Inventor: Robert K. Emrich, Portland, Oreg.

[73] Assignee: ESCO Corporation, Portland, Oreg.

[21] Appl. No.: 254,259

[22] Filed: Oct. 6, 1988

Related U.S. Patent Documents

Reissue of:

[64] Patent No.: 4,761,900
Issued: Aug. 9, 1988
Appl. No.: 937,982
Filed: Dec. 4, 1986

[51] Int. Cl.[4] ..... E02F 9/28

[52] U.S. Cl. ..... 37/142 R; 37/142 A

[58] Field of Search ..... 37/142 R, 142 A

[56] References Cited

U.S. PATENT DOCUMENTS

| | | | |
|---|---|---|---|
| 2,312,802 | 3/1943 | Crawford | 37/142 A |
| 2,991,569 | 7/1961 | Launder | 37/142 A |
| 4,335,532 | 6/1982 | Hahn et al. | 37/142 R |
| 4,349,232 | 9/1982 | Braun et al. | 37/142 A |
| 4,455,771 | 6/1984 | Poncin | 37/142 A |
| 4,761,900 | 8/1988 | Emrich | 37/142 R |

*Primary Examiner*—Edgar S. Burr
*Assistant Examiner*—Huong Q. Pham
*Attorney, Agent, or Firm*—Tilton, Fallon, Lungmus & Chestnut

[57] ABSTRACT

An excavating tooth assembly including an adapter, a point equipped with rearwardly projecting tongues, and locking means including a vertical pin external of the adapter nose held in place by a shrouded spring loaded plug disposed perpendicularly to the line of mounting the point on the adapter, the pin having arcuate front and back surfaces for wedging engagement with laterally projecting ears on the nose and a laterally projecting lug on a point tongue.

12 Claims, 2 Drawing Sheets

EXCAVATING TOOTH ASSEMBLY

Matter enclosed in heavy brackets [ ] appears in the original patent but forms no part of this reissue specification; matter printed in italics indicates the additions made by reissue.

BACKGROUND AND SUMMARY OF INVENTION

This invention relates to an excavating tooth assembly and more particularly, to an assembly featuring a novel lock arrangement for removably securing a point on an adapter.

Traditional excavating tooth locking devices depend on enclosure within centrally located apertures in the tooth components for development of dislodgement resistive forces. Until the development of the HELI-LOK ® twist-on point (U.S. Pat. No. 4,335,532) virtually all commercial teeth used a combination of a rigid lock such as a pin and a resilient keeper such as a plug. Historically, the rubber plug operated through the lock to tighten the point on the nose of the adapter and these same tightening forces maintained the engagement of the plug with the locking pin to resist pin ejection. The drawback in this approach was that resistance to pin dislodgement diminished as the point/nose fit loosened through service—with resultant reduction in tooth tightening forces.

The above-mentioned '532 patent did not use centrally located apertures for containment but rather a U-shaped lock straddling the adapter and engaging rearwardly extending tongues on the point. This realized a significant increase in strength over preceding teeth. Relative to the '532 patent I have invented a new locking system therefor which offers several improvements and advantages over the U-shaped fastener.

The invention involves an externally mounted elongated shaped lock which provides a point tightening force through cooperative engagement with two vertically disposed ears connected by a ledge on one side of the adapter nose and with the lug on one ear of the point through spring-like deformation from its free shape. This lock is maintained in place by engagement with a retractable plug centrally located in the side of the adapter nose. The adapter nose ears project from the side of the nose a distance approximately equal to the thickness of the elongated lock. The connecting ledge provides a guide function when the lock is driven into place and then a secondary bearing function in operation of the tooth assembly to prevent overstressing of the lock. This ledge projects from the side of the nose a distance of approximately half the thickness of the elongated lock. The invention provides the following advantages and improvements:

1. Extended lock life through a unique stabilized wedge action;
2. Reduction of effort for lock removal;
3. Reduced cost;
4. No requirement for a dedicated lock removal tool; and
5. Increase in adapter nose life.

The instant invention is described in conjunction with an illustrative embodiment in the accompanying drawing, in which FIG. 1 is a fragmentary side elevational view of a tooth embodying the invention;

DETAILED DESCRIPTION

The instant invention find advantageous application in connection with the excavating tooth of the previously-mentioned co-owned U.S. Pat. No. 4,335,532 which has been marketed widely under the trademark HELI-LOK ®. In certain instances, there has difficulty of removal of the U-shaped fastener. In any event, the lock of the instant invention reduces the fairly high force requirement required in the '532 patent for lock removal.

Figure 2:
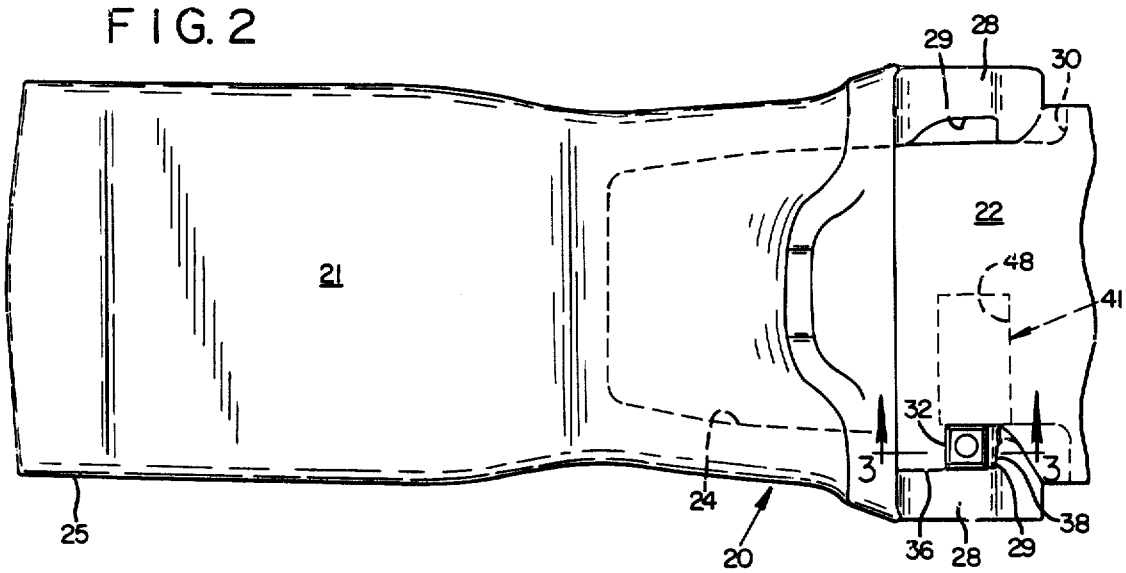
FIG. 2 is a top plan view of the tooth of FIG. 1.
Figure 1:
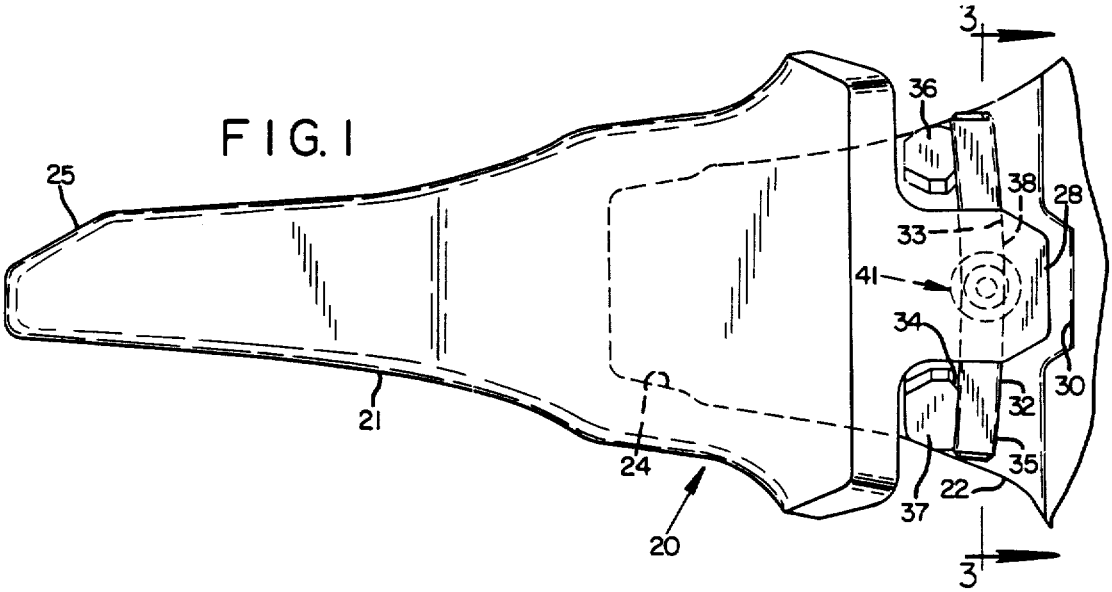
Figure 10:
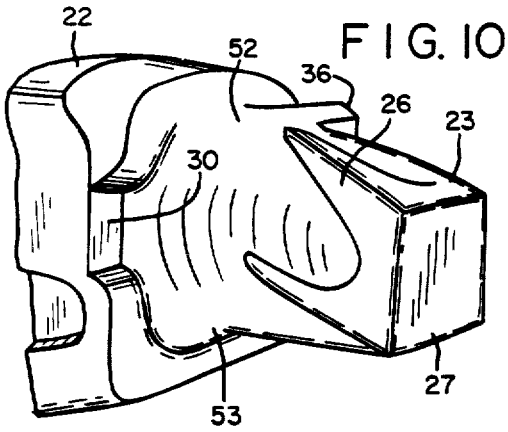
FIG. 10 is a fragmentary perspective view of the adapter employed in the practice of the invention and featuring the right or "lockless" side.

In the illustration given, the numeral 20 designates generally the inventive tooth assembly. As seen in FIGS. 1 and 2 the numeral 21 designates the point element. The point 21 is mounted on an adapter 22. More particularly, the adapter 22 has a nose 23 (see particularly FIGS. 10 and 11) which is received within a socket 24 (see FIGS. 1 and 2). The point 20 has a digging or earth engaging edge or bit 25 at the end thereof opposite the socket 24. Conventionally, the point 21 is installed on the adapter 22 by a lineal movement along the longitudinal center line or axis of the tooth 20.

As in the '532 patent, the point and adapter employ generally helical thread means for achieving the coupling between the point 21 and adapter 22. In the illustration given the threads or helical flutes 26 are provided on the exterior of the nose 23 (see FIGS. 10 and 11). In similar fashion, the nose 23 is equipped with a stabilized end part as at 27 and for additional details hereof, reference is hereby made to the '532 patent.

In the operation of the '532 construction (and here as well) the point 21 was positioned with its socket end in alignment with the forward end of the nose. Grooves (not shown) in the point were aligned with the threads 26 and installation was achieved by rotating the point 21 through approximately 45°. Thereafter, a generally U-shaped lock was inserted into the two side tongues 28 (see FIG. 2). These tongues 28 extend rearwardly of the point 21 and have slots 29 therein. The adapter nose has mating recesses 30 to receive the tongues 28. The tongues 28 on the point 21 enter the recesses 30 at the last stage of point rotation incident to mounting.

Figure 13:
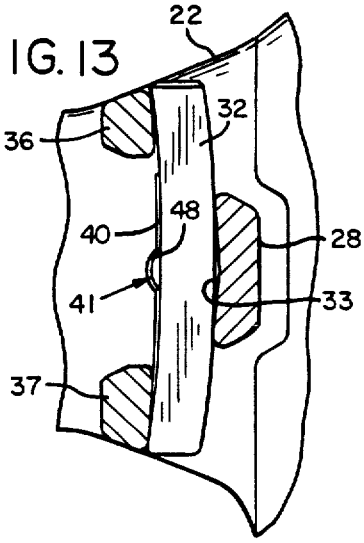
FIG. 13 is a sectional view taken along the line 13—13 of FIG. 2.

The lock generally designated 31 (see FIG. 3) of the instant invention differs significantly from that previously employed with the '532 patent construction, consisting in the illustrated embodiment of only a single pin as contrasted to the U-shaped lock previously employed. The pin or lock bar is designated 32 and is seen to be deformed as at 33 (see FIGS. 1 and 13) to provide a point tightening force.

The creation of this tightening force is facilitated by a variable width profile consisting of a "large radius", concave forward edge 34 and a "smaller radius", convex rear edge 35 (see FIG. 5), For example, the pin 32 for the size 67 HELILOK ® is 5.9" long with the concave forward edge 34 being developed by a 22" radius and the rear edge or surface by a 16" radius. The cross sectional dimensions at the ends are approximately 0.75"×0.80" with the larger dimension extending between the surfaces 34 and 35. At mid-length, this dimension is 0.870".

Figure 11:
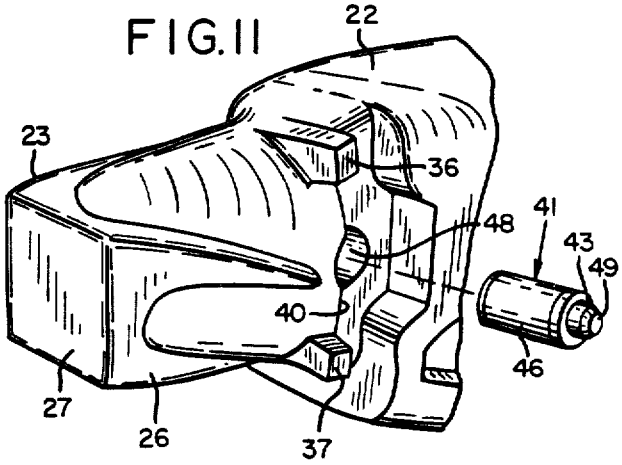
FIG. 11 is a fragmentary perspective view of the adapter of FIG. 10 and featuring the left or "lock-equipped" side, and also illustrating the plug in exploded relation thereto.

In installation of the pin 32, the forward edge 34 contacts a pair of vertically disposed ears 36, 37 which project from one side of the modified design HELILOK ® nose (see FIGS. 1 and 11). The rear edge 35 contacts the lug 38 on one of the point tongues 28 (compare FIGS. 1 and 2). The lugs 38 are provided at the extreme rear of the tongues 28 and are partially defined by the slots 29.

Figure 12:
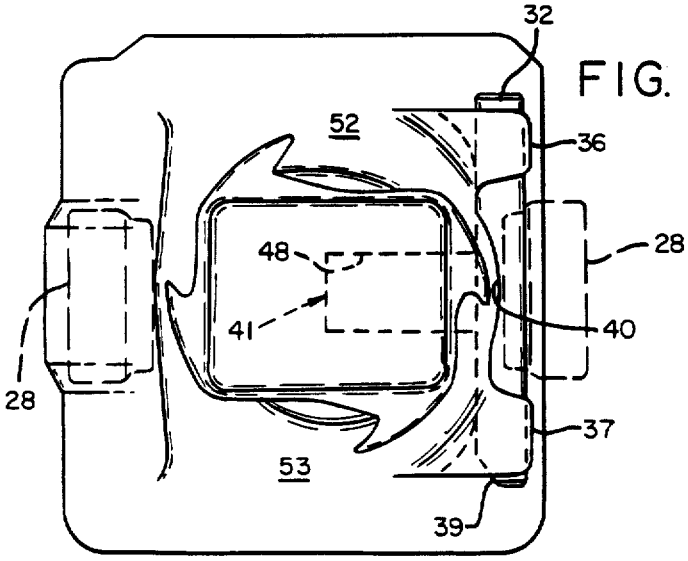
FIG. 12 is a front end view of the adapter similar to the showing in FIG. 3.

During assembly the relatively narrower end width of the pin 32 (see FIGS. 5, 6 and 9 at 39) enters, without resistance, the available opening between the point tongue lug 38 and the ledge 40 (see FIG. 12) extending between the vertically disposed nose ears 36, 37. As the pin 32 is driven into this opening its rear edge 35 engages the point lug 38 such that lateral deformation of the pin 32 is induced. This elastic deformation creates a point tightening force against the point tongue lug.

It is the geometry of the forward edge relative to the rear edge of the pin that produces a wedge tightening affect on the point tongue lug. This geometry eliminates one of the negative aspects of a traditional straight taper wedge, which is the tendency to disassemble under load. With a straight taper wedge, there is always a component of tooth loading tending to dislodge the wedge. With the instant invention, there is no such component. This geometry may be considered as providing a stabilized wedge force by virtue of elimination of the dislodgement force component.

Figure 4:
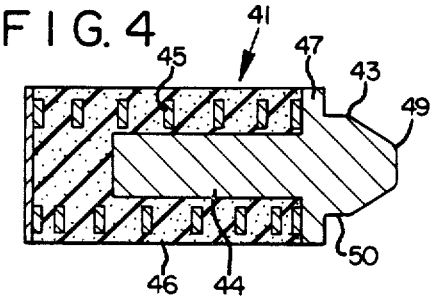
FIG. 4 is an enlarged sectional view of the keeper plug illustrated at the right-hand portion of FIG. 3.
Figure 3:
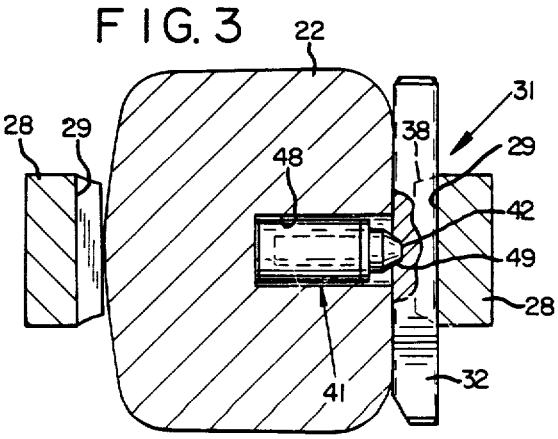
FIG. 3 is a sectional view along the line 3—3 of FIG. 1.
Figure 8:
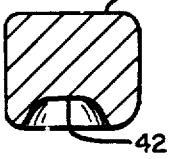

As indicated above, the pin 32 is beveled at one end as at 39—for engagement during assembly with the spring plug generally designated 41. As best seen in FIGS. 3 and 8 the pin 32 is equipped with a generally conically shaped side recess 42 which receives the end of a similarly shaped plug member 43 (see FIG. 4). The plug member 43 is equipped with an axially extending shank 44 about which a helical spring 45 is mounted.

Still further, the spring 45 and shank 44 are encapsulated with a shrouding means 46 which advantageously may take the form of self-skinning polyurethane rubber. This avoids problems of lock removal which sometimes were difficult because of frozen dirt which can pack around the spring in the assembly. Also, by encapsulating the spring 45 and shank 44 in the means 46 inward of the base 47 of the plug member 43, a unitary element 41.

The self-skinning shroud means 46 seals out clay and fines which hinder plug function and the shroud means is capable of great deformation without loss of resiliency through the fact that water is prevented from entering the foam cells.

Figure 5:
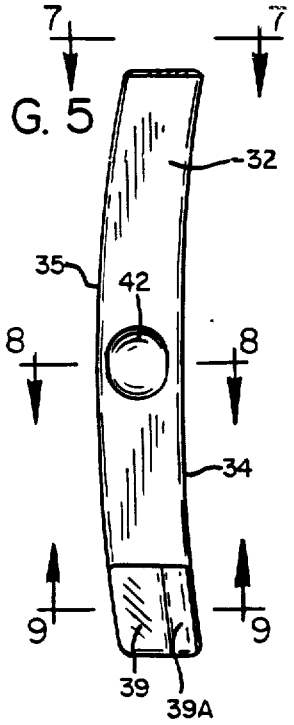
FIG. 5 is an enlarged side elevational view of the locking pin seen in the left-hand portion of FIG. 1.
Figure 6:
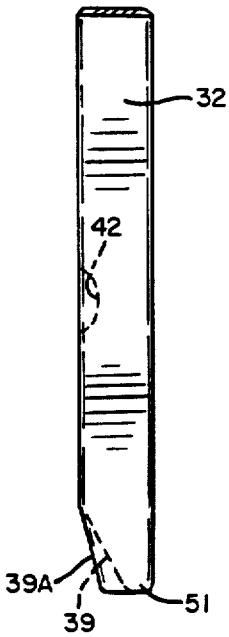
FIG. 6 is a front elevational view of the pin of FIG. 5.
Figure 7:
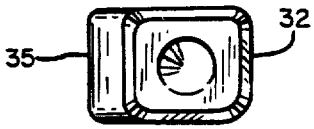
FIGS. 7–9 are sectional views through the pin of FIG. 5 along the lines 7—7, 8—8 and 9—9 respectively.
Figure 9:
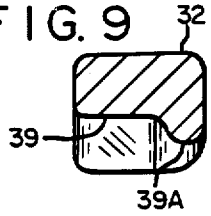

The cooperative engagement of the pin with the plug 41 at the beginning of assembly is arranged to prevent accidental reverse assembly of the pin. As properly oriented for assembly the beveled end 39 of the pin 32 will engage the tip of the plug member 43 such that, when the pin is driven toward assembly, the total plug 41 is forced by a wedging action into the circular bore 48 (see FIG. 11) in the side of the adapter nose and against the pressure of spring 45. Because the conical tip 49 of the plug is joined to the flange bearing or base portion 47 of the plug by an intermediate cylindrical portion 50, this plug wedging action will not occur when the pin is positioned in a reverse orientation. In this instance, the blunt portion 51 (see FIG. 6) of the pin end will flatly contact the cylindrical portion of the plug tip so that assembly is prevented. Assembly of the pin upside down is prevented by the same means. The beveled end 39 is equipped with an integral guide **39*a* as seen in FIGS. 5 and 9 to assist the insertion of the pin 32**.

Spring loaded locks have been disclosed in the prior art, for example, U.S. Pat. No. 2,635,366 but this suffers from the drawback of having the lock retention force operating in the same direction as the point mounting direction. Another prior art teaching that employs detent like means for mounting a point on the adapter is co-owned U.S. Pat. No. 4,577,423 but no springs are employed.

A commercially available locking system employs a central flex pin which forces two side pins into holes in the point sidewall, thereby giving four surfaces of point retention. However, the side pins have nothing to do with retaining the central flex pin in assembly.

Still another type of spring usage is seen in co-owned U.S. Pat. No. 4,501,079 which employs a very wide spring to achieve only secondary tightening capability to prevent rattling.

The adapter nose rear, top and bottom profiles are continuous uninterrupted surfaces as at 52 and 53 (see FIG. 10) made possible because the two ears 36 and 37 project only sidewardly. This optimizes the nose in resistance to fatigue failures in the area of the lock.

The ledge 40 joining the two vertically disposed nose ears 36, 37 and formed by the termination of the conically shaped nose is characterized by the same lateral alignment with the point tongue lug 38 as exists in the co-owned U.S. Pat. No. 4,335,532. This creates the same longitudinal shear loading on the pin as exists on the U-shaped lock, wherein a pin of comparatively small size and low cost is structurally adequate.

While in the foregoing specification a detailed description of an embodiment of the invention has been set down for the purpose of illustration, many variations in the details hereingiven may be made by those skilled in the art without departing from the spirit and scope of the invention.

I claim:

1. An excavating tooth comprising an adapter and a point, said adapter having means at the rear end for connection to a bucket or the like, a nose at the forward end for coupling to said point and ear means on one side of said nose, said point having an earth engaging edge at one end constituting the tooth forward end and a socket at the rear end for coupling to said adapter nose by movement along the tooth longitudinal axis and tongue means extending rearwardly from said socket for cooperative action with said adapter ear means, and lock means externally of said nose and on one side thereof releasably connecting said point and adapter, said lock means consisting essentially of a generally elongated pin member disposed generally transversely of said axis and having generally arcuate forward and rear surfaces for wedging engagement with said ear and tongue means, said pin member being equipped with a recess in confronting relation to said adapter, said adapter having a bore transverse to said longitudinal axis said one side rearward of said ear means and aligned with said pin member recess and a plug member in said bore resiliently engaging said pin member recess.

2. The tooth of claim 1 in which said pin member generally arcuate surfaces are developed by different radii.

3. The tooth of claim 1 in which said pin member is equipped with a beveled end for engagement with said plug member to prevent inadvertent reverse installation of said pin member.

4. The tooth of claim 1 in which said plug member is equipped with shrouding means and spring means to prevent dirt from engaging the spring portion of said plug member.

5. The tooth of claim 4 in which said plug member includes a shank-equipped conical headed plug, a helical spring disposed about said shank, the said shrouding means surrounds said spring to prevent dirt deposit between the spring convolutions.

6. An excavating tooth comprising an adapter and a point, said adapter having a nose at one end for coupling to said point, said point having an earth engaging edge at one end constituting the tooth forward end and a socket at the other end for coupling to said adapter by movement along the tooth longitudinal axis, said point having a tongue extending rearwardly beyond said socket, a plurality of cooperating generally helical thread means on said nose and in said socket whereby said point is rotated to install the same on said adapter, and a pair of vertically spaced ears externally of said nose and only on one side thereof, and lock means engaging said ears and tongue for releasably connecting said point and adapter and to prevent reverse rotation of said point when the same is installed on the said adapter, said lock means consisting essentially of a relatively elongated pin member having a generally rectangular cross-section providing a surface facing said nose and opposed forward and rearward surfaces, said rear surface engaging said tongue, said forward surface engaging said spaced ears, said pin surface facing said nose being equipped with a recess, said nose being equipped with a bore transverse to said longitudinal axis and in alignment with said surface recess, and a plug member in said bore resiliently engaging said pin member.

7. An excavating tooth assembly including an adapter nose having a laterally projecting spaced ears on one side thereto, a point having a rearwardly projecting tongue positioned between said ears, and locking means consisting essentially of a vertical pin external of the adapter nose disposed perpendicularly to the longitudinally-extending line of mounting the point on the adapter, said pin having front and back surfaces in wedging engagment with said ears and tongue, bore transverse to said longitudinally-extending line in said adapter between said spaced ears and a resilient plug member in said bore engaging said pin.

8. A tooth assembly comprising a nose-equipped member and a socket-equipped point each having helical thread means for rotational mounting of said point on said adapter along a longitudinally extending axis, said point having a locking tongue extending rearwardly beyond said socket, said tongue having an inwardly-facing lug for engagement with a vertically installed locking pin, said nose on only one side thereof being equipped with a pair of spaced ears flanking said tongue forwardly of said lug, a ledge on said nose between said ears and generally aligned therewith, and an elongated locking pin installed between said ears and lug, said locking pin consisting essentially of an elongated element having a convex rear surface engaging said lug and a concave forward surface engaging said ears, said ledge and lug providing guide means for installing said locking pin, said locking pin having a generally planar surface confronting said nose, said generally planar surface having a recess resilient plug means in said nose extending transversely of said longitudinal axis and engaging said recess in said planar surface, said locking pin having an end beveled downward and away from said planar surface to wedgingly engage said resilient plug means incident to locking pin installation and prevent inadvertent reverse installation of said locking pin.

9. The tooth assembly of claim 8 in which said resilient plug means includes a spring-loaded tip portion engaging said recess, said tip portion including a flange-like base engaging said spring and integral cylindrical and conical portions extending toward said recess.

10. The tooth assembly of claim 8 in which said beveled end includes a longitudinally-extending integral guide.

11. An excavating tooth comprising an adapter and a point, said adapter having means at the rear end for connection to a bucket or the like, a nose at the forward end for coupling to said point and ear means on one side of said nose, said point having an earth engaging edge at one end constituting the tooth forward end and a socket at the rear end for coupling to said adapter nose by movement along the tooth longitudinal axis and tongue means extending rearwardly from said socket for cooperative action with said adapter ear means, and lock means externally of said nose and only on one said thereof releasably connecting said point and adapter, said lock means consisting essentially of a generally elongated pin member disposed generally transversely of said axis and having generally arcuate forward and rear surfaces for wedging engagement with said ear and tongue means, said pin member being equipped with a recess in confronting relation to said adapter, said adapter having a bore transverse to said longitudinal axis on said only one side rearward of said ear means and aligned with said pin member recess and a plug member in said bore resiliently engaging said pin member recess.

12. An excavating tooth assembly including an adapter nose having laterally projecting spaced ears on only one side thereto, as point having a rearwardly projecting tongue positioned between said ears, and locking means consisting essentially of a vertical pin external of the adapter nose disposed perpendicularly to the longitudinally extending line of mounting the point on the adapter, said pin having front and back surfaces in wedging engagement with said ears and tongue, a bore in said adapter transverse to said longitudinal extending line between said spaced ears and a resilient plug member in said bore engaging said pin.

* * * * *